Oct. 31, 1950     W. J. ROEHL     2,528,180

PIPE CLAMP

Filed March 2, 1946

*INVENTOR.*
WILLIAM J. ROEHL
BY Albert J. McCauley
ATTORNEY.

Patented Oct. 31, 1950

2,528,180

UNITED STATES PATENT OFFICE 2,528,180

PIPE CLAMP

William J. Roehl, Kirkwood, Mo.

Application March 2, 1946, Serial No. 651,643

1 Claim. (Cl. 248—56)

This invention relates to pipe clamps, and it has special advantages in the clamping of pipes to underframes of railway cars. Such operations are performed under rather difficult conditions wherein the operator is located in an uncomfortable position below the body of the car. My object is to simplify this work by the production of a pipe clamp which is forced to its clamping condition, and positively locked therein, by merely striking hammer blows on one end of a locking member.

These simple hammer blows are directed to the large end of a tapering key, and they result in bending of the reduced end of the key under conditions which result in simultaneously clamping and locking the key-operated clamp. No additional effort, or change of position of the operator, is required to insure the desired locked clamping condition.

The invention is primarily directed to the specific cooperative arrangement of details herein disclosed to illustrate a highly desirable commercial form of the invention. However, the scope of this patent extends to variations described by the claims hereunto appended.

Figure 1:
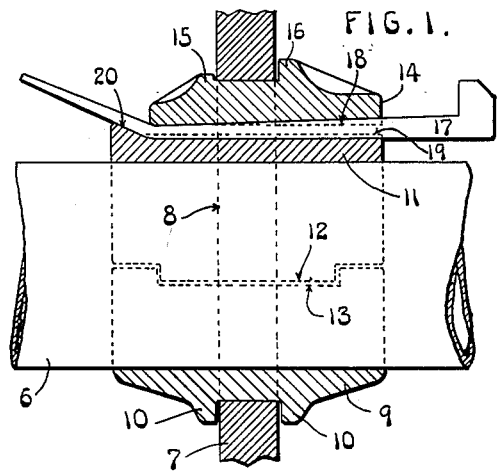
Fig. 1 is longitudinal showing the clamping device as it appears when the key is deflected to positively lock the pipe in its clamped condition.

In this form of the invention, a pipe 6 is clamped and locked to a vertical support 7, which may be considered as a part of the underframe of a railway car. This support 7 has a relatively large circular hole 8 to receive the pipe 6, and the clamping device is inserted into said hole 8.

The clamping elements include a semi-circular clamping member 9 embracing the pipe 6 and having peripheral abutments 10 adapted to interlock with the support 7, said abutments 10 being at opposite sides of the support 7.

A second semi-circular clamping member 11 also embraces the pipe 6, and the companion clamping members 9 and 11 have meeting edges interlocked with each other. For example, the lower edges of the clamping member 11 may be provided with lugs 12 extending into recesses 13 of the clamping member 9. This interlock prevents or limits longitudinal displacement of the companion clamping members.

Figure 3:
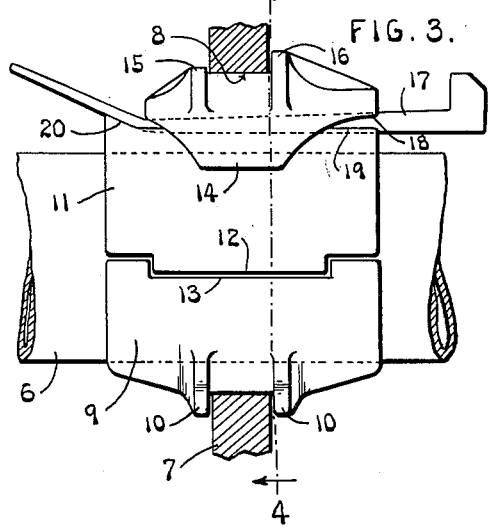
Fig. 3 is a side view of the locked clamping device applied to a support which is shown in section.
Figure 4:
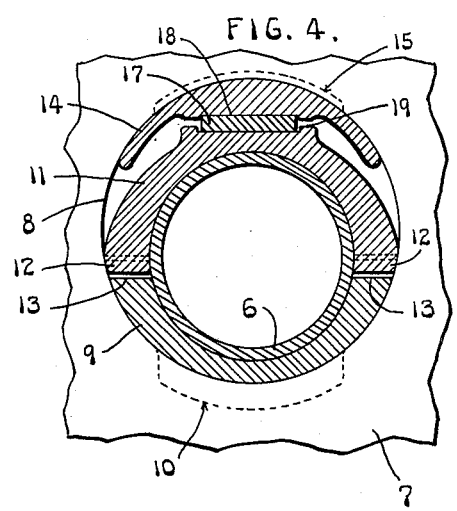
Fig. 4 is a section on the line 4—4 in Fig. 3.

The clamping member 11 is not directly interlocked with the support 7, but is provided with a retaining member 14, preferably in the form of a saddle having outer exposed abutments 15 and 16 which interlock with said support 7, as shown in Figures 1, 3 and 4, during the clamping operation. The retaining saddle 14 is then separated from the clamping member 11.

Figure 2:
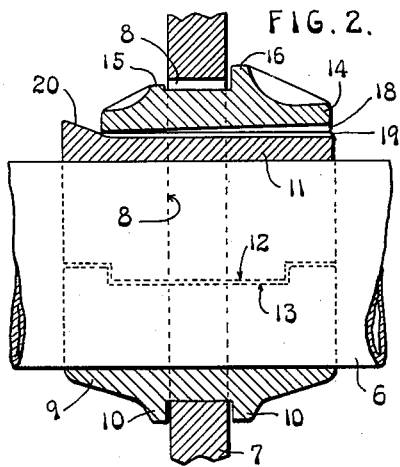
Fig. 2 is a similar view of the clamping elements in a loose condition, as they appear before the locking key is inserted.
Figure 5:
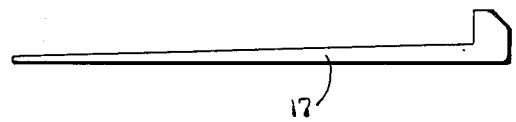
Fig. 5 is a side view of the elongated, tapering key in a straight condition, to be inserted into the loose clamping device shown in Fig. 2.

However, at a preliminary stage shown by Fig. 2, the retaining member 14 may be loosely seated on the clamping member 11. This loose condition permits the small lug 15 of the retaining saddle to pass through the hole 8 of the support 7, and the parts are thus loosely assembled to receive a "self-locking" key 17. This elongated tapering key, in a straight condition, is shown in Fig. 5.

The retaining saddle 14 is provided with an internal longitudinal guideway 18, which may be inclined at the top to receive the inclined top face of the tapering key 17. The clamping member 11 is provided with an external guideway 19 facing said internal guideway 18. These guideways 18 and 19 form an elongated tapering passageway in a direction longitudinally of the pipe 6. The reduced end of the straight key 17 (Fig. 5) is freely inserted into the registering guideways 18 and 19, shown in Fig. 2, so as to shift the loose saddle 14 into positive interlocking engagement with the support 7. The large end of said key 17 is then subjected to forcible hammer blows which tighten the clamping device.

Attention is now directed to a means for positively locking the clamping device in its tightened condition.

The guideway 19 has an inclined cam extension 20 at one end in a line extending away from the axis of the pipe, to receive and deflect the reduced end of the slidable key 17 in response to hammer blows at the opposite end of said key. More specifically stated, this inclined cam extension 20 is preferably adjacent to but immediately beyond an end of the saddle 14, so as to positively bend the key at said end of the saddle.

It will be important to observe that the saddle 14 is shorter than the top clamping member 11, and that the outwardly inclined cam extension 20 lies immediately beyond an end of the shortened saddle, so as to provide for free outward bending of the key 17 at said end of the saddle. Under these specific conditions, the body of the key will be firmly seated between the bottom of the saddle 14 and the top clamping member 11, while the reduced end of the key is deflected outwardly, away from the pipe 6, in an area between the cam 20 and an end of the deliberately shortened saddle.

I claim:

A pipe clamp comprising a semi-circular clamping member having peripheral abutments adapted to interlock with a support, a second semi-circular clamping member, said clamping members having meeting edges interlocked with each other, a retaining saddle located adjacent to but separated from said second clamping member, said retaining saddle having outer exposed abutments adapted to interlock with said support and an internal longitudinal guideway, said second clamping member being provided with an external longitudinal guideway facing said internal guideway, one of said longitudinal guideways being at an angle to the other so as to form an elongated tapering passageway in a direction longitudinally of the pipe, and an elongated tapering key slidable in said guideways to force the clamping members into clamping engagement with the pipe, the external guideway of said second clamping member having an outwardly inclined cam extension at one end in a line extending away from the axis of the pipe, to deflect the reduced end of said slidable key away from the pipe in response to hammer blows at the opposite end of said key, said saddle being shorter than said second clamping member, and said outwardly inclined cam extension being adjacent to but immediately beyond an end of said relatively short saddle, so as to provide for free outward bending of the key at said end of the saddle.

WILLIAM J. ROEHL.

REFERENCES CITED

The following references are of record in the file of this patent:

UNITED STATES PATENTS

| Number | Name | Date |
| --- | --- | --- |
| 1,710,965 | Burnett | Apr. 30, 1929 |
| 1,749,135 | Harter | Mar. 4, 1930 |